United States Patent
Nakano et al.

(10) Patent No.: US 6,306,957 B1
(45) Date of Patent: Oct. 23, 2001

(54) THERMAL CONDUCTIVE SILICONE RUBBER COMPOSITIONS AND MAKING METHOD

(75) Inventors: Akio Nakano; Hiroshi Takei; Takeshi Hashimoto, all of Usui-gun; Yuuki Sakurai, Matsuida-machi, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/521,776

(22) Filed: Mar. 9, 2000

(30) Foreign Application Priority Data

Mar. 11, 1999 (JP) .................................................. 11-064173

(51) Int. Cl.$^7$ ...................................................... C08K 3/10
(52) U.S. Cl. ......................... 524/700; 524/847; 525/477; 528/15; 528/24; 528/32; 528/31; 556/482; 556/458
(58) Field of Search .................................... 524/700, 847; 525/477; 528/15, 24, 32, 31; 556/482, 458

(56) References Cited

U.S. PATENT DOCUMENTS

| | | | |
|---|---|---|---|
| 4,292,224 | * | 9/1981 | Theodore . |
| 6,074,963 | * | 6/2000 | Okami et al. . |

FOREIGN PATENT DOCUMENTS

| | | |
|---|---|---|
| 47-32400 | 11/1972 | (JP) . |
| 64-69661 | 3/1989 | (JP) . |
| 2-196453 | 8/1990 | (JP) . |
| 7-266356 | 10/1995 | (JP) . |
| 8-238707 | 9/1996 | (JP) . |
| 9-296114 | 11/1997 | (JP) . |

OTHER PUBLICATIONS

Kroschwitz, Encyclopedia of Chemical Technology, 4th Ed., vol. 2, Wiley–Interscience, 1992, p. 305.*
Kroschwitz, Encyclopedia of Chemical Technology, 4th Ed., vol. 21, Wiley–Interscience, 1997, p. 981.*
Freeman, Silicones, The plastics Institute, 1962, Table 2.2.*
PAJ English language abstract of JP 64–69661.
PAJ English language abstract of JP 2–196453.
PAJ English language abstract of JP 7–266356.
PAJ English language abstract of JP 8–238707.
PAJ English language abstract of JP 9–296114.

* cited by examiner

*Primary Examiner*—Robert Dawson
*Assistant Examiner*—Kuo-Liang Peng
(74) *Attorney, Agent, or Firm*—Millen, White, Zelano & Branigan, P.C.

(57) ABSTRACT

An organopolysiloxane, a hydrolyzable group-bearing methylpolysiloxane, a thermal conductive filler, and a curing agent are blended to form a silicone rubber composition which is minimized in viscosity or plasticity increase and remains effectively moldable and workable even when loaded with a large amount of the thermal conductive filler. It cures into a silicone rubber part having a high thermal conductivity.

12 Claims, No Drawings

THERMAL CONDUCTIVE SILICONE RUBBER COMPOSITIONS AND MAKING METHOD

This invention relates to thermal conductive silicone rubber compositions loaded with large amounts of thermal conductive fillers and a method for preparing the same.

BACKGROUND OF THE INVENTION

Heat-generating electronic or electric parts such as power transistors and thyristors deteriorate their performance due to the heat generated. It is a common practice in the prior art that such heat-generating electronic or electric parts are provided with heat sinks for heat dissipation or suitable means for conducting heat to a metal chassis of the associated equipment for heat release. To improve both electrical insulation and heat transfer, electrically insulating sheets of silicone rubber loaded with thermal conductive fillers often intervene between heat-generating parts and heat sinks.

As the thermal conductive, electrically insulating material, JP-A 47-32400 discloses an electrically insulating composition comprising 100 parts by weight of synthetic rubber, typically silicone rubber and 100 to 800 parts by weight of at least one metal oxide selected from beryllium oxide, aluminum oxide, hydrated aluminum oxide, magnesium oxide, and zinc oxide.

As the thermal conductive material for use in areas where electrical insulation is not required, U.S. Pat. No. 4,292,223, U.S. Pat. No. 4,292,224, U.S. Pat. No. 4,292,225 and U.S. Pat. No. 4,293,477 disclose a composition comprising 100 parts by weight of an addition curing type silicone rubber and 60 to 500 parts by weight of a thermal conductive powder such as silver, gold or silicon.

These thermal conductive materials, however, have a thermal conductivity of less than 1.5 W/mK. If silicone rubber compositions are loaded with large amounts of thermal conductive fillers in order to improve the heat transfer thereof, the compositions lose fluidity in the case of liquid compositions and increase plasticity in the case of millable compositions. In either case, the compositions become very difficult to mold and work.

One solution to this problem is found in JP-A 1-69661 which discloses a good thermal conductive rubber/plastic composition loaded with alumina consisting of 10 to 30% by weight of alumina particles having a mean particle size of up to 5 $\mu$m and the balance of spherical corundum of single particles having a mean particle size of at least 10 $\mu$m and of cutting edge-free shape. Also, U.S. Pat. No. 5,352,731 discloses a thermal conductive silicone rubber composition comprising 100 parts by weight of a base of an organopolysiloxane gum having an average degree of polymerization of 6,000 to 12,000 combined with an organopolysiloxane oil having an average degree of polymerization of 200 to 2,000 and 500 to 1,200 parts by weight of spherical aluminum oxide powder.

However, in the case of high loading of more than 1,000 parts by weight of aluminum oxide powder or more than 70% by volume of aluminum oxide, for example, even these methods relying on a combination of particles or a viscosity adjustment of the silicone base encounter a certain limit in improving the moldability and workability of silicone rubber compositions.

In electronic machines such as personal computers and CD-ROM drives, IC chips including LSI and CPU are increased in the degree of integration. Since such closely integrated IC chips generate more amounts of heat, conventional cooling means including heat sinks and cooling fans are sometimes unsatisfactory. In particular, portable notebook type personal computers are difficult to built in heat sinks or cooling fans because only a limited space is available inside. In such machines, IC chips are mounted on printed circuit boards which use as the substrate glass-reinforced epoxy resins and polyimide resins characterized by poor thermal conduction. It is then ineffective to release heat to the substrates through thermal conductive, electrically insulating sheets as in the prior art.

Then, heat-dissipating parts of air cooling or forced cooling type are disposed in proximity to IC chips so that the heat generated in the chips is conducted to the heat-dissipating parts. When the heat-dissipating part is in close contact with the IC chip, heat transfer is retarded due to surface irregularities. When a thermal conductive, electrically insulating sheet intervenes between the heat-dissipating part and the IC chip, the less flexibility of the insulating sheet allows the differential thermal expansion between the chip and the part to apply stresses to the chip, resulting in chip failure.

Additionally, the attachment of a heat-dissipating part to each circuit chip requires an extra space, preventing size reduction. A system capable of cooling a plurality of IC chips with a single heat-dissipating part is employed in such cases.

In particular, CPU's of the BGA type used in notebook type personal computers require deliberate consideration of a cooling system because they have a reduced height, but an increased heat release as compared with ordinary CPU's.

Where semiconductor chips of different heights are arranged with gaps therebetween, a low hardness, good thermal conductive material capable of filling the gaps becomes necessary. There is a demand for a thermal conductive sheet having a high thermal conductivity and flexibility and being compliant with gaps of differing size and shape. As the drive frequency becomes higher, CPU's improve their performance, but produce larger amounts of heat. A better thermal conductive material is desired in this regard too.

JP-A 2-196453 discloses a sheet molded from a silicone resin loaded with a thermal conductive substance such as a metal oxide wherein a flexible, deformable silicone layer lies on a silicone resin layer having a sufficient strength to withstand handling. JP-A 7-266356 discloses a thermal conductive composite sheet comprising a silicone rubber layer containing a thermal conductive filler and having an Asker C hardness of 5 to 50 and a porous reinforcement layer having pores with a diameter of at least 0.3 mm. JP-A 8-238707 discloses a sheet in the form of a flexible three-dimensional reticulated or foam member whose skeleton lattice surface is coated with a thermal conductive silicone rubber. U.S. Pat. No. 5,705,258 discloses a thermal conductive composite silicone sheet with a reinforcing sheet or cloth incorporated therein, having at least one surface which is tacky, an Asker C hardness of 5 to 50, and a thickness of up to 0.4 mm. JP-A 9-296114 discloses-a spacer obtained by curing a composition comprising an addition reaction type liquid silicone rubber and a thermal conductive, electrically insulating ceramic powder, and having an Asker C hardness of up to 25 and a thermal resistance of up to 3.0° C./W.

These low hardness, thermal conductive sheets, however, suffer from the problem that when an attempt is made to increase the heat transfer of a corresponding composition by loading it with a larger amount of thermal conductive filler, the composition loses fluidity and becomes difficult to mold.

SUMMARY OF THE INVENTION

Therefore, an object of the invention is to provide a thermal conductive silicone rubber composition which is minimized in viscosity increase or plasticity increase and remains effectively moldable and workable even when loaded with a large amount of thermal conductive filler, and which gives a high thermal conductive silicone rubber molded article. Another object of the invention is to provide a method for preparing the thermal conductive silicone rubber composition.

It has been found that when (A) an organopolysiloxane, (B) a hydrolyzable group-bearing methylpolysiloxane, (C) a thermal conductive filler, and (D) a curing agent to be defined below are blended, the resulting silicone rubber composition is minimized in viscosity increase or plasticity increase and remains effectively moldable and workable even when loaded with a large amount of the thermal conductive filler, and gives a silicone rubber molded article featuring a high flexibility and high thermal conductivity.

It has also been found that by heat treating components (A) to (C) above 80° C., cooling the resulting base compound below 40° C., and adding component (D) thereto, the above-mentioned silicone rubber composition can be manufactured in an industrially advantageous manner.

In the composition, the blending of the hydrolyzable group-bearing methylpolysiloxane (B) as a wetter is effective for reducing the viscosity or plasticity of the base compound. Even when the thermal conductive filler is blended in large amounts of 30 to 90% by volume in order to increase the thermal conductivity, the composition of the liquid type maintains a low viscosity and good fluidity and the composition of the millable type maintains a low plasticity. Whether the composition is of the liquid or millable type, the composition maintains a sufficient softness or compliance to fill in gaps of differing size or shape between chips or related parts and is effectively moldable and workable. In summary, the inventive composition features a high thermal conductivity and good moldability and workability, can be prepared to either the liquid type or the millable type, and be reduced in hardness. It is then useful as a thermal conductive sheet material for use in general power sources, electronic machines, and integrated circuit chips.

The invention provides a thermal conductive silicone rubber composition comprising (A) an organopolysiloxane of the following average compositional formula (1), (B) a hydrolyzable group-bearing methylpolysiloxane of the following general formula (2), (C) a thermal conductive filler, and (D) a sufficient amount to effect curing of a curing agent. Provided that components (A), (B) and (C) combined sum to 100% by volume, component (A) accounts for 2 to 69.9% by volume, component (B) accounts for 0.1 to 50% by volume, and components (A) and (B) combined account for 10 to 70% by volume, and component (C) accounts for 30 to 90% by volume.

Herein $R^1$ is independently a substituted or unsubstituted monovalent hydrocarbon group and letter a is a positive number of 1.90 to 2.05.

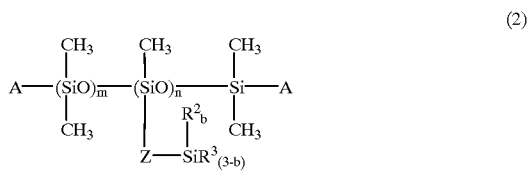

Herein $R^2$ is a monovalent hydrocarbon group of 1 to 4 carbon atoms, $R^3$ is an alkoxy or acyloxy group of 1 to 4 carbon atoms, A is methyl or a group $—Z—SiR^2_bR^3_{3-b}$, Z is oxygen or a divalent hydrocarbon group of 2 to 10 carbon atoms, letter b is equal to 0, 1 or 2, m is an integer of 3 to 100, n is an integer of 0 to 50, satisfying $5 \leq m+n \leq 100$, at least one A being $—Z—SiR^2_bR^3_{3-b}$ when n=0.

In another aspect, the invention provides a method for preparing the thermal conductive silicone rubber composition defined above, comprising the steps of heat treating components (A), (B) and (C) at a temperature of at least 80° C. to form a base compound, cooling the base compound to below 40° C., and blending the cooled base compound with component (D).

DESCRIPTION OF THE PREFERRED EMBODIMENTS

In the thermal conductive silicone rubber composition of the invention, component (A) is an organopolysiloxane of the following average compositional formula (1).

Herein $R^1$, which may be identical or different, is a substituted or unsubstituted monovalent hydrocarbon group, preferably of 1 to 10 carbon atoms. Examples include alkenyl groups such as vinyl and allyl, alkyl groups such as methyl, ethyl and propyl, cycloalkyl groups such as cyclopentyl and cyclohexyl, aryl groups such as phenyl and tolyl, aralkyl groups such as benzyl and phenylethyl, and halogenated hydrocarbon groups in which some of the hydrogen atoms are replaced by halogen atoms such as chlorine or fluorine atoms. The letter a is a positive number of 1.90 to 2.05.

The preferred organopolysiloxanes of formula (1) are those organopolysiloxanes whose backbone consists essentially of dimethylsiloxane units and analogous organopolysiloxanes in which vinyl, phenyl or trifluoropropyl groups are introduced.into the backbone. The content of vinyl is preferably 0.01 to 10 mol % and especially 0.02 to 5 mol %.

The organopolysiloxanes are desirably those whose molecular chain is end-capped with a triorganosilyl or hydroxyl group. Exemplary triorganosilyl groups are trimethylsilyl, dimethylvinylsilyl and trivinylsilyl groups.

The organopolysiloxane (A) should preferably have a degree of polymerization of 100 to 12,000, more preferably 200 to 10,000 though not critical. This range suggests that the organopolysiloxane used as component (A) covers a variety of forms from oil to gum form. Then the composition can be prepared to either the liquid type or the millable type.

Component (B) is a hydrolyzable group-bearing methylpolysiloxane of the following general formula (2).

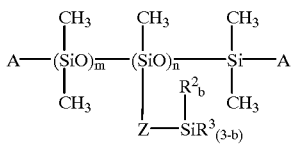

(2)

In formula (2), $R^2$ stands for monovalent hydrocarbon groups of 1 to 4 carbon atoms, for example, alkyl groups such as methyl, ethyl, propyl and butyl. $R^3$ stands for alkoxy or acyloxy groups of 1 to 4 carbon atoms, for example, methoxy, ethoxy, n-propoxy, isopropoxy, n-butoxy, and acetoxy.

A is methyl or a group —Z—$SiR^2_b R^3_{3-b}$. Z is an oxygen atom or a divalent hydrocarbon group of 2 to 10 carbon atoms. Illustrative divalent hydrocarbon groups are alkylene groups, for example, —$CH_2CH_2$—, —$CH_2CH_2CH_2$—, —$CH_2CH_2CH_2CH_2CH_2CH_2$—, and —$CH_2CH(CH_3)CH_2$—.

The letter b is equal to 0, 1 or 2, preferably 0 or 1, and most preferably 0. The letter m is an integer of 3 to 100, preferably 5 to 50, and n is an integer of 0 to 50, preferably 0 to 10, satisfying $5 \leq m+n \leq 100$, and preferably $5 \leq m+n \leq 60$. If m+n is less than 5 or more than 100, the methylpolysiloxane becomes less effective for reducing the viscosity or plasticity of the composition. It is noted that at least one of the two A's is a group represented by —Z—$SiR^2_b R^3_{3-b}$ when n=0.

Preferably, the hydrolyzable methylpolysiloxane (B) is a hydrolyzable methylpolysiloxane which is trifunctional at one terminus as represented by the following general formula (3):

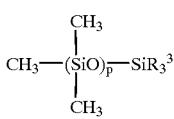

(3)

wherein $R^3$ is as defined above, and letter p is an integer of 5 to 100. The trifunctional-terminated hydrolyzable methylpolysiloxane is more effective in reducing the viscosity or plasticity of the composition.

Typical, non-limiting, examples of the hydrolyzable methylpolysiloxane (B) are given below.

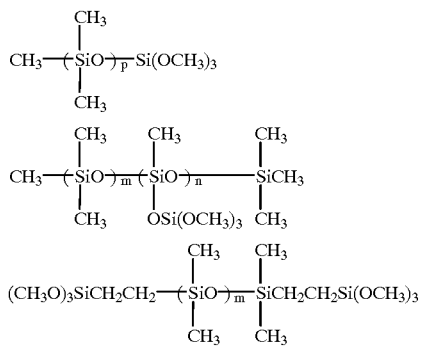

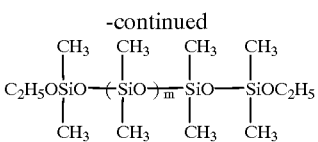

-continued

The amount of hydrolyzable methylpolysiloxane (B) blended is 0.1 to 50% by volume, and preferably 0.5 to 30% by volume. Less amounts are less effective in reducing the viscosity or plasticity of the composition whereas excessive amounts achieve no further effects because of saturation and can produce an undesirable influence after curing.

Component (C) is a thermal conductive filler which may be selected from a variety of fillers, typically inorganic powders and metal powders.

Illustrative of the thermal conductive filler are inorganic powders such as aluminum oxide, zinc oxide, silicon oxide, silicon carbide, silicon nitride, magnesium oxide, aluminum nitride, boron nitride, and graphite, and metal powders such as aluminum, copper, silver, nickel, iron, and stainless steel. Of these, inorganic powders such as aluminum oxide, zinc oxide, silicon oxide, silicon carbide, silicon nitride, magnesium oxide, and graphite, and metal powders such as aluminum, copper, silver, nickel, iron, and stainless steel are preferable. The thermal conductive filler used herein may be a mixture of any two or more of these inorganic powders and metal powders.

The thermal conductive filler preferably has a mean particle size of up to 50 μm and especially 0.1 to 40 μm. A filler with a greater mean particle size is less dispersible so that when a silicone rubber liquid loaded therewith is allowed to stand, the filler will settle out.

In the practice of the invention, it is recommended to combine a thermal conductive filler powder fraction having a large mean particle size (typically in the range of 5 to 40 μm) and a thermal conductive filler powder fraction having a small mean particle size (typically in the range of 0.1 to 3 μm) in a ratio corresponding to the theoretical closest packing distribution curve. This improves the packing efficiency, achieving a lower viscosity and a higher thermal conductivity.

The thermal conductive filler is preferably of a round shape approximate to a sphere. A filler of rounder shape is more effective for preventing a viscosity rise even at high loadings.

Such spherical thermal conductive fillers are commercially available under the trade name of spherical alumina AS series from Showa Denko K. K. and high purity spherical alumina AO series from Admatechs K. K.

An appropriate amount of the thermal conductive filler (C) blended is such that the volume fraction of components (A) and (B) combined is 70 to 10% by volume and the volume fraction of component (C) is 30 to 90% by volume, and preferably the volume fraction of components (A) and (B) combined is 60 to 15% by volume and the volume fraction of component (C) is 40 to 85% by volume. It is noted that components (A), (B) and (C) sum to 100% by volume. If the amount of component (C) is too small, the composition becomes insufficiently thermal conductive. If the amount of component (C) is too large, blending becomes difficult and the composition has a too high viscosity or plasticity to mold and work.

Component (D) is a curing agent, the type of which is not critical and may be properly selected from well-known curing agents commonly used for the silicone rubber curing purpose. Illustrative examples of the curing agent include organic peroxides for radical reaction such as di-t-butyl peroxide, 2,5-dimethyl-2,5-di(t-butylperoxy)hexane and dicumyl peroxide. Where the organopolysiloxane (A) has alkenyl groups, addition reaction type curing agents are useful comprising an organohydrogenpolysiloxane having at least two hydrogen atoms each attached to a silicon atom in a molecule and a platinum group metal catalyst.

With respect to the amount of the curing agent (D) added, organic peroxides may be added in ordinary amounts as in conventional silicone rubber compositions, for example, 0.1 to 10 parts, and especially 0.2 to 5 parts by weight per 100 parts by weight of components (A) and (B) combined.

When it is desired that molded articles of thermal conductive silicone rubber have a lower hardness, an addition reaction type curing agent as mentioned just above is preferably used in a liquid silicone rubber composition as the curing agent (D). The organohydrogenpolysiloxane serving as a crosslinking agent is of a linear, branched or cyclic molecule having at least two hydrogen atoms each attached to a silicon atom, preferably having a viscosity of 1 to 1,000 centistokes (cs) at 25° C.

The organohydrogenpolysiloxane is preferably added in such amounts that 0.05 to 3 equivalents, especially 0.1 to 2 equivalents of SiH groups on the organohydrogenpolysiloxane are available per alkenyl group on the organopolysiloxane (A). If the addition amount is less than 0.05 equivalent, there would arise such problems as a lower crosslink density, a lower cured hardness, and difficulty of molding and handling. If the addition amount is more than 3 equivalents, the cured composition would have a too high hardness.

As the platinum group metal catalyst, well-known platinum metal and platinum compounds are preferred. The amount of the catalyst added is preferably 0.1 to 1,000 ppm, and more preferably 1 to 500 ppm of platinum group metal.

If desired, other additive components may be added to the thermal conductive silicone rubber composition of the invention. One such optional additive component used for the purpose of adjusting the addition reaction curing rate and shelf stability of the composition includes vinyl-bearing organopolysiloxanes such as methylvinylcyclotetrasiloxane, triallyl isocyanurate, acetylene alcohol and siloxane-modified products thereof.

Also, reinforcing silica, colorants, heat resistance modifiers (e.g., iron oxide and cerium oxide) and adhesive aids may be added insofar as the benefits of the invention are not impaired. These optional components may be added in ordinary amounts.

In preparing the thermal conductive silicone rubber composition of the invention, the organopolysiloxane (A), the hydrolyzable group-bearing methylpolysiloxane (B), and the thermal conductive filler (C) are first mixed in a suitable mixer such as a planetary mixer, kneader or Shinagawa mixer and heat treated at a temperature of at least 80° C., preferably 120 to 200° C. to form a base compound. In this step, the base compound can be reduced in viscosity or plasticity even without application of heat, if kneading is continued over an extended period of time. For shortening the manufacturing process and reducing the load to the mixer, heat acceleration is preferable.

Next, the base compound is cooled to 40° C. or below, preferably to room temperature, whereupon the curing agent (D) is added and blended. This sequence of steps succeeds in effectively preparing the thermal conductive silicone rubber composition.

According to the invention, the thermal conductive silicone rubber composition thus prepared is molded and cured into molded articles of thermal conductive silicone rubber. Depending on whether the composition is the liquid type or millable type, an appropriate molding method may be selected from the following methods. Compression molding:

An uncured composition is admitted into a mold, which is closed. Using a heat press machine, heat and pressure are applied to the composition for curing. Injection molding:

Into a heated mold in an injection molding machine, an uncured composition is injected through a nozzle to fill the mold cavity with the composition. After curing, the mold is opened, allowing the molded article to be taken out. Coating:

A length of film (e.g., PET) is continuously fed through a coating machine where an uncured liquid composition is applied to the film to a predetermined thickness using a knife coater, and then through a heating oven where the liquid composition cures.

Extrusion Molding:

Using an extruder having a die combined with a nipple, go an uncured millable type composition is formed into a tubular shape, which is passed through a heating oven where the composition cures.

Calender Molding:

Using a calender, an uncured composition is sheeted to a predetermined thickness. The sheet is transferred onto a film, which is passed through a heating oven where the composition cures.

For the inventive composition, curing conditions may be suitably adjusted in accordance with a particular molding method employed. Typical curing conditions include a temperature of 100 to 400° C. and a time of 2 seconds to 30 minutes.

By curing the inventive composition in this way, there is obtained a molded article which desirably has a thermal conductivity of at least 1.5 W/mK, and more desirably at least 2.0 W/mK.

Additionally, the molded article of the inventive composition preferably has an Asker C hardness of 2 to 50, especially 5 to 40, as measured by means of an Asker C hardness meter. The Asker C hardness is measured in accordance with the standards of the Japanese Society of Rubber Industry SRIS 0101 and JIS S-6050. Using a spring type hardness instrument Asker C model, measurement is made on a stack of two sheets of each 6 mm thick. A too low hardness (Asker C hardness) indicates that the rubber layer has poor strength, which can lead to difficulty of molding and a loss of mass productivity. A too high hardness indicates that the rubber layer is too hard, probably becoming less adhesive to heat-generating parts and less compliant to part configuration.

Thermal conductive silicone rubber sheets obtained from the inventive composition may be reinforced by embedding therein glass cloth, cloth or non-woven fabric of polyester or nylon, or resin films of polyimides, nylon or polyesters. Then the sheets are increased in strength and restrained from elongation so that they are more easy to handle, leading to more efficient operation.

EXAMPLE

Examples of the invention are given below by way of illustration and not by way of limitation. All parts are by weight.

Examples 1–3 & Comparative Example 1

As component (A), there were used 20 parts of (A-1) a dimethylpolysiloxane blocked with a dimethylvinylsiloxy group at each end and having a viscosity of 30,000 cs at 25° C., 60 parts of (A-2) a dimethylpolysiloxane blocked with a dimethylvinylsiloxy group at each end and having a viscosity of 600 cs at 25° C., 10 parts of (A-3) an organopolysiloxane consisting of 0.7 mol % of methylvinylsiloxane units and 99.3 mol % of dimethylsiloxane units, blocked with a trimethylsiloxy group at each end and having a viscosity of 15,000 cs at 25° C., and an amount as shown in Table 1 of (A-4) a dimethylpolysiloxane blocked with a trimethylsiloxy group at each end and having a viscosity of 1,000 cs at 25° C. As component (C), there were used 640 parts of spherical aluminum oxide powder AS-30 having a mean particle size of 16 μm and 160 parts of aluminum oxide powder AL-45-H having a mean particle size of 3 μm (both available from Showa Denko K.K.). As component (B), there was used an amount as shown in Table 1 of (B-1) a hydrolyzable group-bearing methylpolysiloxane of the following structural formula.

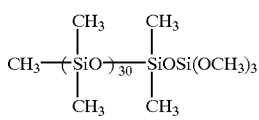

Using a planetary mixer, the above components (A) to (C) were mixed at room temperature for 10 minutes, heated to a temperature of 150° C., mixed for 30 minutes at the temperature. The resulting base compounds (Examples 1 to 3) were cooled to room temperature (25° C.) and measured for viscosity at 25° C.

For comparison purposes, a base compound was prepared as above except that the hydrolyzable group-bearing methylpolysiloxane (B-1) was omitted. Its viscosity was similarly measured.

After each of the base compounds was cooled to room temperature, as component (D), 0.36 part of a vinylsiloxane complex of chloroplatinic acid (platinum content 1%) was added and uniformly mixed, 0.09 part of ethynyl cyclohexanol was added and mixed, and finally 2.5 parts of an organo-hydrogenpolysiloxane (SiH content 0.0031 mol/g) represented by the following formula, having a viscosity of 18 cs at 25° C. was added and uniformly mixed. A low hardness, thermal conductive silicone rubber composition of liquid type was prepared in this way. The ratio of SiH to vinyl was 0.7.

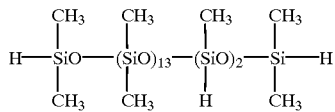

The low hardness, thermal conductive silicone rubber compositions were compression molded at 150° C. for 10 minutes into sheets of 6 mm thick, which were measured for hardness using an Asker C hardness meter. Separately the compositions were compression molded into blocks of 20 mm thick, which were measured for thermal conductivity using a thermal conductivity meter Shotherm QTM (quick thermal conductivity meter by Showa Denko K.K.). The results of measurement are shown in Table 1 together with the fractions (% by volume) of the respective components.

TABLE 1

| Composition (pbw) | E1 | E2 | E3 | CE1 |
|---|---|---|---|---|
| Organopolysiloxane (A-1) | 20 | 20 | 20 | 20 |
| Organopolysiloxane (A-2) | 60 | 60 | 60 | 60 |
| Organopolysiloxane (A-3) | 10 | 10 | 10 | 10 |
| Organopolysiloxane (A-4) | 10 | 6 | 2 | 14 |
| Aluminum oxide | 800 | 800 | 800 | 800 |
| Hydrolyzable group-bearing methylpolysiloxane (B-1) | 4 | 8 | 12 | — |
| Organopolysiloxane fraction (vol %) | 33.3 | 32.0 | 30.6 | 34.6 |
| Thermal conductive filler fraction (vol %) | 65.4 | 65.4 | 65.4 | 65.4 |
| Hydrolyzable group-bearing methylpolysiloxane fraction (vol %) | 1.3 | 2.6 | 4.0 | — |
| Base compound viscosity (poise) | 9,000 | 7,000 | 5,200 | 21,000 |
| Asker C hardness | 20 | 18 | 17 | 27 |
| Thermal conductivity (W/mK) | 2.5 | 2.5 | 2.4 | 2.5 |

As seen from Table 1, the thermal conductive silicone rubber compositions containing hydrolyzable group-bearing methylpolysiloxane (Examples 1 to 3) have the advantages that the corresponding base compounds have a low viscosity enough to facilitate compression molding and injection molding and the cured articles have a high thermal conductivity.

Example 4 & Comparative Example 2

As component (A), there were used 80 parts of (A-5) a dimethylpolysiloxane consisting of dimethylsiloxane units, blocked with a dimethylvinylsiloxy group at each end and having an average degree of polymerization of 8,000, and 15 parts of the dimethylpolysiloxane (A-4) used in Examples 1–3. As component (C), there was used 1,200 parts of spherical aluminum oxide powder Admafine AO-41R having a mean particle size of 10 μm (available from Admatechs K.K.). As component (B), there was used 5 parts of the hydrolyzable group-bearing methylpolysiloxane (B-1) used in Examples 1-3. Also used herein was 5 parts of α,ω-dihydroxydimethyl-polysiloxane of the following structural formula.

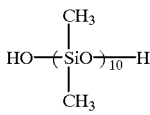

Using a kneader, the above components were kneaded, then heat treated at a temperature of 170° C. for one hour, obtaining a base compound.

For comparison purposes, a base compound was prepared as above except that the hydrolyzable group-bearing methylpolysiloxane (B-1) was omitted.

Each of the base compounds was cooled to room temperature and measured for plasticity according to JIS K-6249 using a parallel plate plastometer (Williams Plastometer).

After each of the base compounds was cooled to room temperature, 0.5 part of 2,5-dimethyl-2,5-di(t-butylperoxy)-hexane as component (D) was added thereto using a twin roll mill, yielding a thermal conductive silicone rubber composition of millable type. The composition was molded at a temperature of 165° C. and a pressure of 50 kgf/cm², and heat treated in a dryer at 200° C. for 4 hours, obtaining cured samples, which were measured for hardness (Durometer A)

and thermal conductivity. The measurement procedures are the same as above. The results are shown in Table 2.

TABLE 2

| Composition (pbw) | E4 | CE2 |
|---|---|---|
| Organopolysiloxane (A-5) | 80 | 80 |
| Organopolysiloxane (A-4) | 15 | 20 |
| α, ω-dihydroxydimethylpolysiloxane | 5 | 5 |
| Spherical aluminum oxide powder | 1,200 | 1,200 |
| hydrolyzable group-bearing methylpolysiloxane (B-1) | 5 | — |
| Organopolysiloxane fraction (vol %) | 24.8 | 26.1 |
| Thermal conductive filler fraction (vol %) | 73.9 | 73.9 |
| Hydrolyzable group-bearing methylpolysiloxane fraction (vol %) | 1.3 | — |
| Plasticity @3 min. | 330 | 680 |
| Hardness (Durometer A) | 84 | 92 |
| Thermal conductivity (W/mK) | 3.8 | 3.7 |

As is evident from Table 2, the composition lacking the hydrolyzable group-bearing methylpolysiloxane (Comparative Example 2) is poorly workable since it is not effectively wrapped around the twin roll mill due to a high plasticity. By contrast, the millable type thermal conductive silicone rubber composition of the invention shows a high thermal conductivity as well as good workability due to a low plasticity.

Example 5

As component (A), there were used 20 parts of the dimethylpolysiloxane (A-1), 60 parts of the dimethylpolysiloxane (A-2), 10 parts of the organopolysiloxane (A-3), and 10 parts of the dimethylpolysiloxane (A-4). As component (C), there was used 600 parts of aluminum powder having a mean particle size of 15 $\mu$m. As component (B), there was used 20 parts of (B-2) a hydrolyzable group-bearing methylpolysiloxane of the following structural formula.

$$(CH_3O)_3SiCH_2CH_2-\left(\underset{\underset{CH_3}{|}}{\overset{\overset{CH_3}{|}}{Si}}O\right)_{10}\underset{\underset{CH_3}{|}}{\overset{\overset{CH_3}{|}}{Si}}CH_2CH_2Si(OCH_3)_3$$

Using a planetary mixer, the above components (A) to (C) were mixed at room temperature for 10 minutes, heated to a temperature of 150° C., mixed for one hour at the temperature. The resulting base compound was cooled to room temperature and measured for viscosity as in Examples 1–3.

After the base compound was cooled to room temperature, as in Examples 1–3, as component (D), the vinylsiloxane complex of chloroplatinic acid, ethynyl cyclohexanol and organohydrogenpolysiloxane were added and uniformly mixed, yielding a low hardness, thermal conductive silicone rubber composition of liquid type.

The composition was cured. Its hardness (Asker C) and thermal conductivity were measured, with the following results.

Fraction (% by volume)

Organopolysiloxane: 29.6%

Thermal conductive filler: 64.5%

Hydrolyzable group-bearing methylpolysiloxane: 5.9%

Properties

Viscosity: 12,000 poise

Asker C hardness: 45

Thermal conductivity: 6.5 W/mK

Example 6

Using a kneader, 85 parts of the dimethylpolysiloxane (A-5) used in Example 4 as component (A), 1,400 parts of Admafine AO-41R and 300 parts of zinc oxide powder (Zinc White #1 by Mitsui Metal Mining K. K.) as component (C), 15 parts of the hydrolyzable group-bearing methylpolysiloxane (B-1) used in Examples 1–3 as component (B), and 8 parts of α,ω-dihydroxydimethylpolysiloxane were kneaded, then heat treated at a temperature of 170° C. for 2 hours, obtaining a base compound.

After the base compound was cooled to room temperature, as in Example 4, 2,5-dimethyl-2,5-di(t-butylperoxy)hexane as component (D) was added thereto, yielding a thermal conductive silicone rubber composition of millable type.

As in Example 4, the composition was measured for plasticity, hardness and thermal conductivity. The results are shown below.

Fraction (% by volume)

Organopolysiloxane: 18.3%

Thermal conductive filler: 78.8%

Hydrolyzable group-bearing methylpolysiloxane: 2.9%

Properties

Plasticity @3 mmn: 390

Durometer A hardness: 88

Thermal conductivity: 4.9 W/mK

There has been described a thermal conductive silicone rubber composition which even when loaded with a large amount of thermal conductive filler, is minimized in viscosity increase and maintains fluidity in the case of liquid type, and is minimized in plasticity increase in the case of millable type, so that the composition remains effectively moldable and workable. Permissible high loadings of the thermal conductive filler ensure effective heat transfer. Highly thermal conductive articles can be molded from the inventive composition without a need for expensive highly thermal conductive fillers such as boron nitride and aluminum nitride. When a liquid silicone rubber is used as the base, the composition can be reduced in hardness.

The method of the invention enables to prepare the thermal conductive silicone rubber composition in an industrially advantageous manner.

The inventive composition is optimum as a material for thermal conductive electric insulating sheets for use in general power sources and electronic machines and as a material for low hardness, thermal conductive silicone rubber sheets for dissipating heat away from integrated circuit chips such as LSI and CPU in electronic machines including personal computers and CD-ROM drives.

Japanese Patent Application No. 11-064173 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A thermal conductive silicone rubber composition comprising
   (A) 2 to 69.9% by volume of an organopolysiloxane of the following average compositional formula (1):

$$R^1_a SiO_{(4-a)/2} \quad (1)$$

wherein $R^1$ is independently a substituted or unsubstituted monovalent hydrocarbon group and letter a is a positive number of 1.90 to 2.05,
   (B) 0.1 to 50% by volume of a hydrolyzable group-bearing methylpolysiloxane of the following general formula (3):

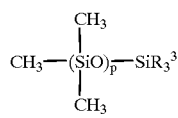

(3)

wherein $R^3$ is an alkoxy or acyloxy group of 1 to 4 carbon atoms, and letter p is an integer of 5 to 100,
   (C) 30 to 90% by volume of a thermal conductive filler, with the proviso that components (A), (B) and (C) combined total 100% by volume and the amount of components (A) and (B) combined is 10 to 70% by volume, and
   (D) a sufficient amount of a curing agent to effect curing.

2. The composition of claim 1 which cures into a silicone rubber having a thermal conductivity of at least 1.5 W/mK.

3. The composition of claim 1 which cures into a silicone rubber having an Asker C hardness of 2 to 50.

4. The composition of claim 1 wherein the curing agent is an addition reaction type curing agent.

5. The composition of claim 1, wherein $R^1$ contains 1–10 carbon atoms.

6. The composition of claim 5, wherein $R^1$ is alkenyl, alkyl, cycloalkyl, aryl, aralkyl or halogenated hydrocarbon groups in which some of the hydrogen atoms are replaced by halogen.

7. The composition of claim 1, wherein the organopolysiloxane of formula (1) has a backbone containing vinyl, phenyl or trifluoropropyl groups.

8. The composition of claim 1, wherein the organopolysiloxane (A) has a degree of polymerization of 100–12,000.

9. The composition of claim 1, wherein the methylpolysiloxane (B) is

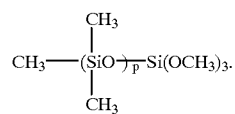

10. A heat producing electronic component having a heat dissipating thermally conductive material molded thereto, wherein the thermally conductive material is one according to claim 1.

11. A method for preparing a thermal conductive silicone rubber composition as set forth in claim 1, comprising:

heat treating components (A), (B) and (C) to form a base compound, cooling the base compound, and blending the cooled base compound with component (D).

12. A method for preparing a thermal conductive silicone rubber composition as set forth in claim 11, comprising:

heat treating components (A), (B) and (C) at a temperature of at least 80° C. to form a base compound, cooling the base compound to below 40° C., and blending the cooled base compound with component (D).

* * * * *